(12) United States Patent
Rugen et al.

(10) Patent No.: US 6,370,997 B1
(45) Date of Patent: Apr. 16, 2002

(54) TRANSPORTABLE BENCH CIRCULAR SAW

(75) Inventors: Hermann Rugen; Peter Landsberg, both of Meppen; Klaus Raasch, Geeste; Andreas Afting, Emsbüren, all of (DE)

(73) Assignee: Elektra Beckum AG, Meppen (DE)

( * ) Notice: Subject to any disclaimer, the term of this patent is extended or adjusted under 35 U.S.C. 154(b) by 0 days.

(21) Appl. No.: 09/424,876

(22) PCT Filed: Jun. 5, 1998

(86) PCT No.: PCT/EP98/03374

§ 371 Date: Dec. 9, 1999

§ 102(e) Date: Dec. 9, 1999

(87) PCT Pub. No.: WO98/56529

PCT Pub. Date: Dec. 17, 1998

(30) Foreign Application Priority Data

| Jun. 9, 1997 | (DE) | 297 10 032 U |
| Jun. 19, 1997 | (DE) | 297 10 712 U |
| Nov. 28, 1997 | (DE) | 297 21 091 U |

(51) Int. Cl.⁷ .............................. B26D 7/06; B27B 5/20; B27B 17/00; B23D 47/02; B23D 45/06
(52) U.S. Cl. .................. 83/100; 83/471.3; 83/490; 83/491; 83/486.1; 83/522.19; 83/477.2
(58) Field of Search .................. 83/471.3, 100, 83/102.1, 477.2, 478, 486.1, 488, 491, 490, 522.19, 788, 794; 144/286.1, 286.5

(56) References Cited

U.S. PATENT DOCUMENTS

| 551,934 A | * 12/1895 | Randall ...................... 83/471.3 |
| 1,796,697 A | * 3/1931 | White ........................ 83/471.3 |
| 2,208,582 A | * 7/1940 | Hollister ..................... 83/471.3 |

(List continued on next page.)

FOREIGN PATENT DOCUMENTS

| EP | 0 014 869 | 9/1980 |
| EP | 0 615 807 | 9/1994 |
| FR | 657 957 | 6/1929 |
| FR | 1 397 855 | 8/1965 |

OTHER PUBLICATIONS

Elektra Beckum, Holzbearbeitungsmaschinen (Wood Working Machines), Oct. 1994, EB–F–100.000/093 301 2131, pp. 1–40.

*Primary Examiner*—Boyer Ashley
(74) *Attorney, Agent, or Firm*—Nixon Peabody LLP; David S. Safran (57) ABSTRACT

A transportable circular table saw having an exterior housing (1) with a tabletop (4) forming a workpiece support surface (3) that is irreversibly arranged in the exterior housing (1), and a saw unit (7) arranged underneath the tabletop (4) with a drive motor and a circular saw blade (10) protruding into the tabletop (4) from below through a saw slot (9), with the exterior housing (1) in plan view being approximately square in shape. The sawing unit (7) is slidable relative to the tabletop (4) in a pulling direction, as a result of which the circular saw blade (10) moves in the saw slot (9) in the pulling direction, and in relation to an axis of a mitre cut in the pulling direction, preferably being able to be inclined to at least one side. The tabletop (4) forms the workpiece support surface (3) and the saw slot (9), is rotatably held in the exterior housing (1) on an axis perpendicular to the workpiece support surface (3), in particular in a surrounding top (14) of the exterior housing (1). Furthermore, the sawing unit (7) with the tabletop (4) is rotatable on the vertical axis, and the exterior housing has a recess (15) emanating from the front and extending across the entire width of the exterior housing (1) under the tabletop (4), and if applicable the surrounding top (14) in which a control element (12, 13) for swivelling the tabletop (4) is arranged so as to be freely swivellable to the right and/or left.

17 Claims, 8 Drawing Sheets

U.S. PATENT DOCUMENTS

| | | | |
|---|---|---|---|
| 2,513,873 A | | 7/1950 | Horton |
| 2,711,762 A | * | 6/1955 | Gaskell ........................ 83/473 |
| 2,719,547 A | * | 10/1955 | Gjerde ....................... 83/471.3 |
| 2,872,955 A | | 1/1959 | Schmitz et al. |
| 3,280,861 A | * | 10/1966 | Gjerde ........................ 83/473 |
| 3,386,482 A | * | 6/1968 | Nadeau ...................... 83/477.1 |
| 3,931,751 A | * | 1/1976 | Simonson .................... 83/859 |
| 3,946,631 A | * | 3/1976 | Malm .................... 83/471.3 X |
| 5,797,307 A | * | 8/1998 | Horton ....................... 83/471.3 |

* cited by examiner

TRANSPORTABLE BENCH CIRCULAR SAW

BACKGROUND OF THE INVENTION

1. Field of the Invention

The invention concerns a transportable circular table saw with an exterior housing having a tabletop forming a workpiece support surface, a sawing unit being arranged in the exterior housing underneath the tabletop with a drive motor and a circular saw blade protruding into the tabletop from below through a saw slot, the sawing unit being slidable in respect of the tabletop in a pulling direction, as a result of which the circular saw blade moves in the saw slot in the pulling direction. The teaching of the present invention thus deals with transportable machines but not with handheld machines.

2. Description of Related Art

There are various types of circular saws in the field of stationary wood working machines (or metal working machines which are also considered here, without this being expressly stated from now on).

A complete program for wood working machines has been provided by the applicant (applicant's brochure "wood working machines" 10/94-EB-F-100.000/093 301 2131). It includes circular table saws as builder's circular saws where only the height of the circular saw blade is adjustable. A further embodiment of a circular table saw not only comprises a height-adjustable sawing unit, but also comprises adjustment for both the height and the lateral inclination at least to one side, either infinitely or in steps (circular table saw TKHS, pages 30 ff. as well as precision circular saw PK 300 K, pages 24 ff. of the applicant's brochure). Mitre cuts in one cutting plane are possible with a circular table saw whose sawing unit can be inclined to one side in respect of the axis of the mitre cut. Bevel mitre cuts or compound cuts can only be made by aligning the workpiece at the desired angle on the workpiece support surfaces on angle stops.

An underbench circular crosscut saw (e.g., underbench circular crosscut saw UK 330, pages 16 ff. of the applicant's brochure) is a further improved circular table saw. With an underbench circular crosscut saw, the sawing unit is not only adjustable in height, and laterally inclinable in respect of the axis of the mitre cut, but the sawing unit can additionally be pulled, from the rearmost position right to the front, in the saw slot of the tabletop. In this way, the length of the cut becomes significantly longer; a workpiece can be fixed and can remain resting on the workpiece support surface while the circular saw blade is being pulled through the workpiece.

The teaching of the present invention is based on an underbench circular crosscut saw (published European Patent Application EP-A-0 615 807). With an underbench circular crosscut saw, beveled mitre cuts can also only be produced by shifting the workpiece. If one wishes to cut a workpiece with an angle in the plane of the workpiece support surface, then here too, the workpiece must be aligned on angle stops in the desired angle position in respect of the circular saw blade.

A cross-cut saw and mitre-cut saw (e.g. KGS 330, pages 6 ff. of the applicant's brochure) has the advantage that beveled mitre cuts can be made without shifting the workpiece. In this saw, the sawing unit is arranged at the top of the tabletop. To carry out cross-cuts, the sawing unit can be hinged down onto the workpiece support surface of the tabletop, by a horizontal hinging axis. If the sawing unit can be pulled on draw rods, larger lengths of cuts can be achieved. Here too, a first axis of the mitre cut is horizontal approximately in the plane of the workpiece support surface. However the tabletop is additionally rotatable to some extent in the exterior housing or in a surrounding top, on a vertical axis perpendicular to the workpiece support surface, with rotation usually being ±45 degrees. The vertical axis represents the second axis of the mitre cut. In this way, mitre cuts in two cutting planes perpendicular to each other, i.e., beveled mitre cuts, can be carried out.

A cross-cut and mitre-cut saw regularly has the disadvantage that very large workpieces cannot be cut because the length of the cut is insufficient. Because the sawing unit is arranged above the tabletop, a large boards shaped workpiece cannot be pushed past the circular saw blade.

A cross-cut, mitre and circular table saw (for example, KGT 550, pages 14 ff. of the applicant's brochure) combines the advantages of a circular table saw with the advantages of a cross-cut and mitre-cut saw. In a cross-cut, mitre and circular table saw, th e tabletop is arranged in the exterior housing so as to be reversible by 180°. The sawing unit is attached on one side of the tabletop. If the tabletop is positioned with the saw unit on the top, the saw can be used as a cross-cut saw and mitre-cut saw. For this purpose, the tabletop itself is arranged in the surrounding top so as to be reversible. In the table saw position, the saw unit is located underneath the tabletop and fixed in a table saw position so that the circular saw protrudes from below through the saw slot. In this position, the tabletop cannot be rotated on its vertical axis; the circular table saw has its usual function. Since the sawing unit is not slidable, the length of the cut in the cross-cut saw is limited by the diameter of the saw blade.

Positioning the workpiece on the workpiece support surface to achieve mitre cuts in the cutting axis or beveled mitre cuts is problematical especially where space is limited. If for example such a saw unit is located in a corridor, there is essentially only one possible alignment for long workpieces. If at all possible, alignment of the circular saw blade in respect of the workpiece should be achievable by changing the position of the circular saw blade and not the workpiece.

An attempt to address the problems shown above has already been made with a saw which is integrated into an elongated workbench (U.S. Pat. No. 2,513,873). Here, the elongated workbench is standing on four fold-out legs. At the right extremity of the elongated workbench, a rotatable tabletop is held on sliding bearings or ball bearings in said elongated workbench. A sawing unit with a circular saw blade is arranged below the tabletop. The said saw unit can be moved in a pulling direction in respect of the tabletop, causing the circular saw blade to move in the pulling direction in a saw slot which extends along a large part of the length of the tabletop. Since the sawing unit on the right is located in a part of the work table which juts out, the tabletop with the sawing unit hanging below, which sawing unit is slidable in the pulling direction, can be rotated on the axis perpendicular to the workpiece support surface.

SUMMARY OF THE INVENTION

It is the object of the invention to improve the known transportable circular table saw of the type explained in the introduction, to the extent that in any case, beveled mitre cuts can be made on it without the need for the workpiece having to be repositioned.

This object is met in a transportable circular table saw with an exterior housing having a tabletop forming a workpiece support surface, a sawing unit being arranged in the exterior housing underneath the tabletop with a drive motor and a circular saw blade protruding into the tabletop from below through a saw slot, the sawing unit being slidable in respect of the tabletop in a pulling direction, as a result of which the circular saw blade moves in the saw slot in the pulling direction. The teaching of the present invention thus deals with transportable machines but not with handheld machines by the housing having a horizontal U-shape having a recess extending from the front face towards the rear and extending across the entire width of the exterior of the housing underneath the tabletop.

According to the invention, the exterior housing of the transportable circular table saw, which in plane view is approximately square in shape, comprises a non-reversible tabletop. This tabletop is however rotatable on a vertical axis aligned perpendicular to the workpiece support surface, in this case held in the surrounding top of the exterior housing. The saw unit is rotatable in the vertical axis together with the tabletop.

Due to the rotation of the tabletop, the circular saw table according to the invention also makes it possible to carry out angular cross cuts and beveled mitre cuts as well as longitudinal cuts in workpieces (at an angle setting of 90°), without the angular position of the workpiece on the workpiece support surface having to be changed. As a positive consequence of this, the circular saw table according to the invention, with any widening or lengthening attachments, can also be used in confined spaces, in particular in narrow halls and corridors.

The concept of the transportable circular table saw according to the invention only becomes possible in that in side view the circular table saw is U-shaped. The control element for freely rotating the tabletop to the right and/or left can be accommodated in the recess created in this way; said recess extending from the front across the entire width of the exterior housing underneath the tabletop.

Below, the invention is explained in more detail with reference to the accompanying drawings.

DETAILED DESCRIPTION OF THE INVENTION

Figure 2:
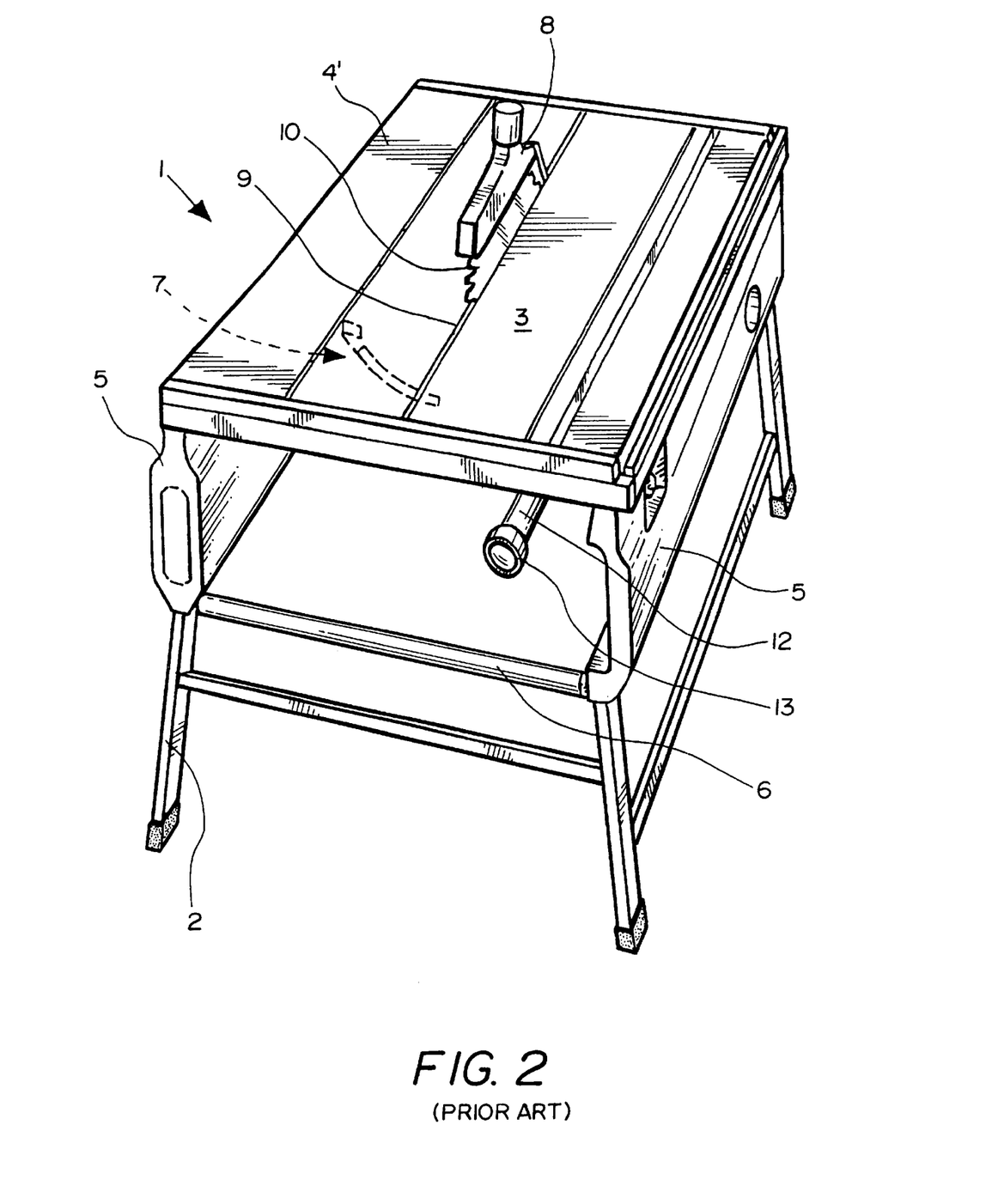
FIG. 2 for the purpose of explaining the basic context of a circular table saw shows the state of the art in the form of an underbench circular crosscut saw.

To explain the basic context, FIG. 2 will be explained first. FIG. 2 shows a transportable circular table saw (published European Patent Application EP-A-0 615 807) configured as an underbench circular crosscut saw, known from the state of the art.

Shown are an exterior housing 1 resting on a subframe 2 which can be folded in a way which is known per se. In this way the entire circular table saw becomes more easily transportable.

The exterior housing 1 comprises a tabletop 4' forming a workpiece support surface 3 which, together with the side panels 5 and at least two cross bars 6 connecting the two side panels 5 at the bottom, comprise the structural elements ensuring torsional rigidity of the exterior housing 1.

Below the tabletop 4', in the exterior housing 1, a sawing unit 7 is arranged which, in FIG. 2, is only indicated and in any case comprises a drive motor and a circular saw blade 10 protruding from below through the tabletop 4 through a saw slot 9. The circular saw blade 10 can be directly flanged to the shaft of the electrical drive motor but it can also be driven by a drive motor some distance away, via transmission elements. A riving knife 8 with protective guard is shown.

As is already shown in FIG. 2, the saw slot 9 essentially extends along the entire length of the tabletop 4', thus defining a longitudinal direction of the circular table saw (parallel to the side panels 5 in the embodiment shown here). The sawing unit 7 is slidable in longitudinal direction on guide rails aligned in longitudinal direction. Sliding takes place by means of a draw bar 12 of which FIG. 2 primarily shows the knob 13 because the sawing unit 7 is positioned at the rear.

Longitudinal slidability of the sawing unit 7 makes it possible for the circular saw blade 10 to be moved in longitudinal direction in the saw slot 9, typical for an underbench circular crosscut saw. The advantage of an underbench circular crosscut saw consists of the principal design characteristics of the circular table saw where only the protruding part of the circular saw blade 10 appears above the tabletop 4' on the workpiece support surface 3, so that large-area workpieces can be pushed past the circular saw blade 10.

Due to the function of the circular table saw, by changing the angular position of the workpiece on the workpiece support surface 3, it becomes possible also to carry out double mitre cuts (beveled mitre cuts). To do so, the draw function can be used to advantage because, in this way, the workpiece need not be moved in an inclined position relative to the circular saw blade 10, but instead, the circular saw blade 10 can be pulled through the workpiece.

All this has by and large been described above, in the general part of the description, in the introduction.

The advantages of a cross-cut saw, mitre-cut saw and circular table saw compared to a circular crosscut saw have been explained in the general part of the description.

Figure 1:
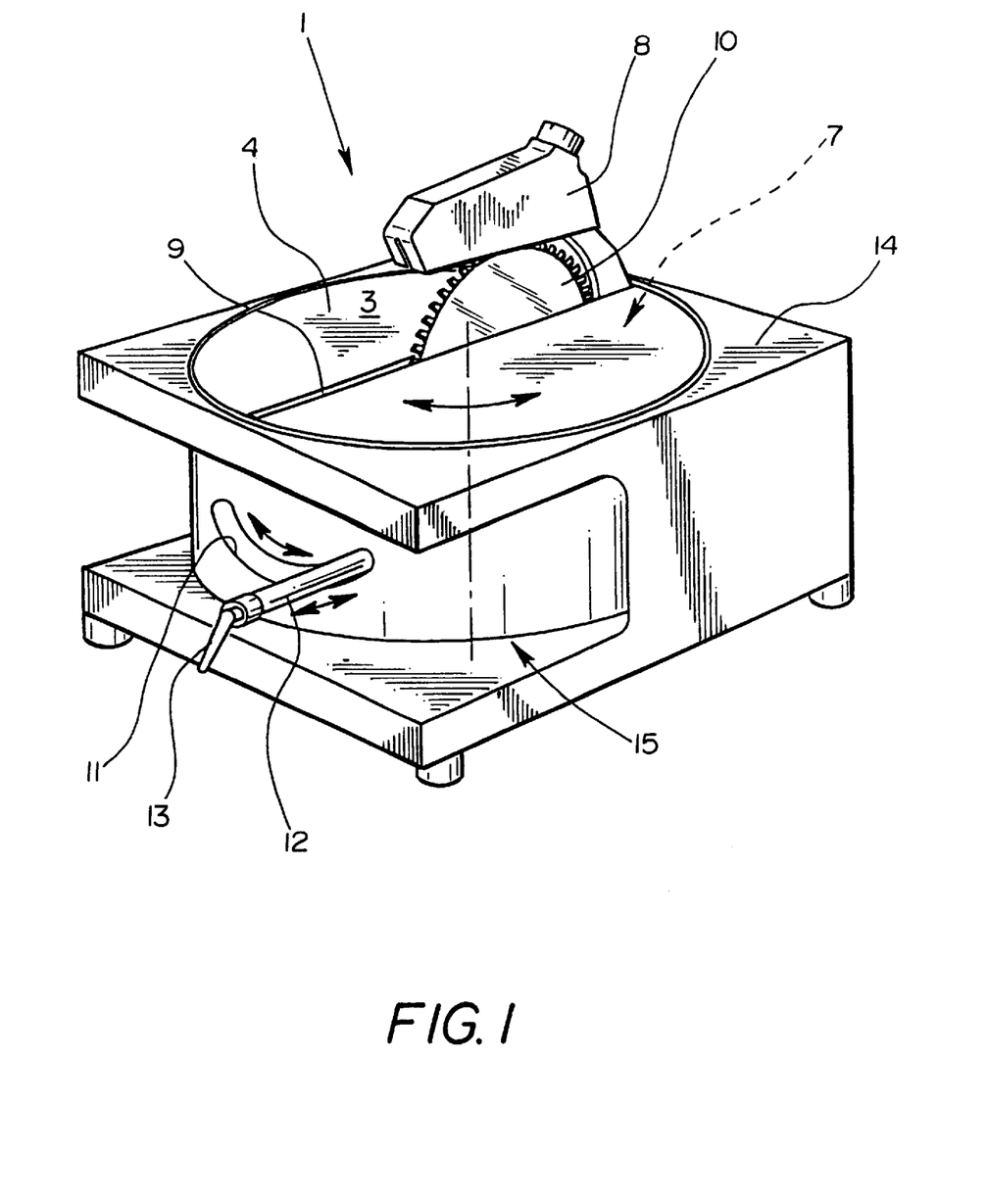
FIG. 1 is a diagrammatic perspective view, much simplified, of a preferred embodiment of a circular table saw according to the invention with a cross-cut, mitre-cut, table and underbench circular crosscut saw function.

FIG. 1 shows a transportable circular table saw which integrates in a practical way the functions of a cross-cut saw, mitre-cut saw and circular table saw in a circular table saw with fixed tabletop 4 or a respective underbench circular crosscut saw. Thus, the tabletop 4 is not arranged reversibly in the exterior housing. The tabletop 4 incorporating its saw slot 9 is, however, held so as to be rotatable in the exterior housing 1 on a vertical axis aligned so as to be perpendicular to the workpiece support surface 3, preferably in a fixed surrounding top 14 of the exterior housing 1. The sawing unit 7 and the tabletop 4 are jointly rotatable on the vertical axis so that in any angular position of the tabletop 4 in respect of the vertical axis, the circular saw blade 10 is movable in the pulling direction, in the saw slot 9.

The sawing unit 7 can run on its own rotary bearings in the exterior housing 1 and can be coupled with the tabletop 4, but it can also be supported on bearings at the tabletop 4 itself and thus be rotatable together with the rotary bearings of said tabletop 4.

With this measure, all the above-mentioned functions are integrated into a single circular table saw. When compared to a pure underbench crosscut saw, the circular table saw according to the invention provides the advantage that by rotating the tabletop 4, even angular cross sections, beveled mitre cuts and longitudinal cuts are possible without changing the angular position of the workpiece. This makes it possible to use the circular table saw 4 according to the invention with any widening and lengthening attachments even in confined spaces, in particular in narrow halls and corridors. This applies in particular to the use of the pull function. Compared to a cross-cut, mitre-cut and circular table saw, the circular table saw according to the invention provides the advantage of much simpler design because the tabletop 4 does not have to be attached to the exterior housing 1 so as to be reversible. Besides, due to the position of the sawing unit 7, a circular table saw is systematically more user-friendly and significantly more stable than a saw where the sawing unit is located above the tabletop 4.

In the embodiment shown, the sawing unit 7 is held on the tabletop 4 so as to be slidable in the pulling direction. To this purpose it is suspended from the tabletop 4 from guide rails so as to be rotatable with the tabletop 4. A slide for the sawing unit 7 is attached so as to be suspended, with the guide rails attached either by screws penetrating the tabletop 4 from above, or by screws turned into the tabletop 4 from below, or said guide rails are themselves an integral part of the tabletop 4.

Figure 3:
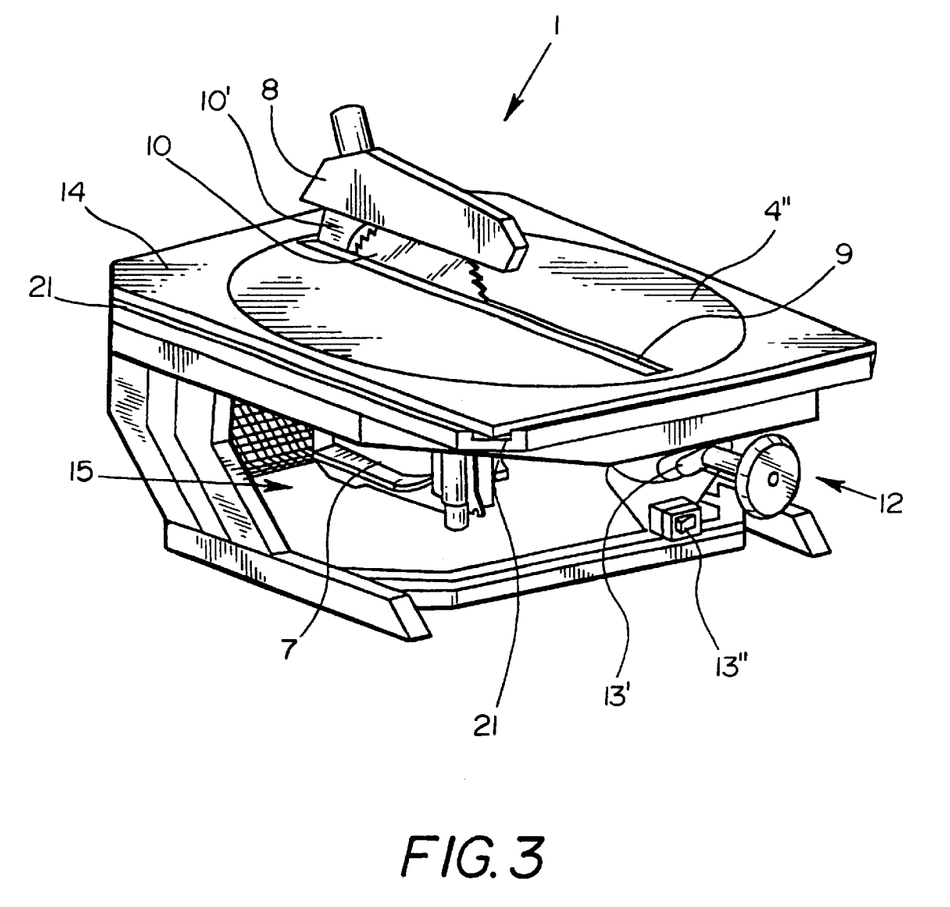
FIG. 3 is a diagrammatic perspective view of a further embodiment of a transportable circular table saw according to the invention.

FIGS. 1 and 3 clearly show that the exterior housing 1 with the surrounding top 14 is of almost square dimensions in top view. "Almost square dimensions" means that a slight diversion from square dimensions is permissible within the scope of the teaching. In essence, the exterior housing 1 should basically be a closed housing. The invention goes beyond the closed housing form for this transportable circular table saw, in that the exterior housing 1 comprises a recess 15 emanating from the front and extending across the entire width of the exterior housing 1 under the tabletop 4, 4" and surrounding top 14, with a control element 12, 13, in FIG. 1 configured as a draw bar 12 with knob 13, for freely swivelling the tabletop 4, 4" to the right and/or left. FIG. 3 shows particularly clearly that in lateral view, the recess 15 imparts a horizontal U-shape to the exterior housing 1.

FIG. 1 shows that with an advantageous shape of the control element 12, 13, single-handed operation can be realized. In this example, locking takes place by turning the knob 13 on its center axis. There is a laterally aligned connecting link 11 for setting the lateral inclination of the circular saw blade 10.

The invention succeeds in combining into one, all the advantages of the previously explained saw types.

An advantageous embodiment provides for the tabletop 4 to be lockable in regard to its rotational middle position (on the vertical axis), preferably also in other significant rotational positions. Unlocking of the tabletop 4 can be achieved by an unlocking mechanism which is activated by the control element 12, 13. This represents an ergonomically advantageous design. Such an adjustment is known from, e.g. the above-described published European Patent Application EP-A-0 615 807.

Figure 4:
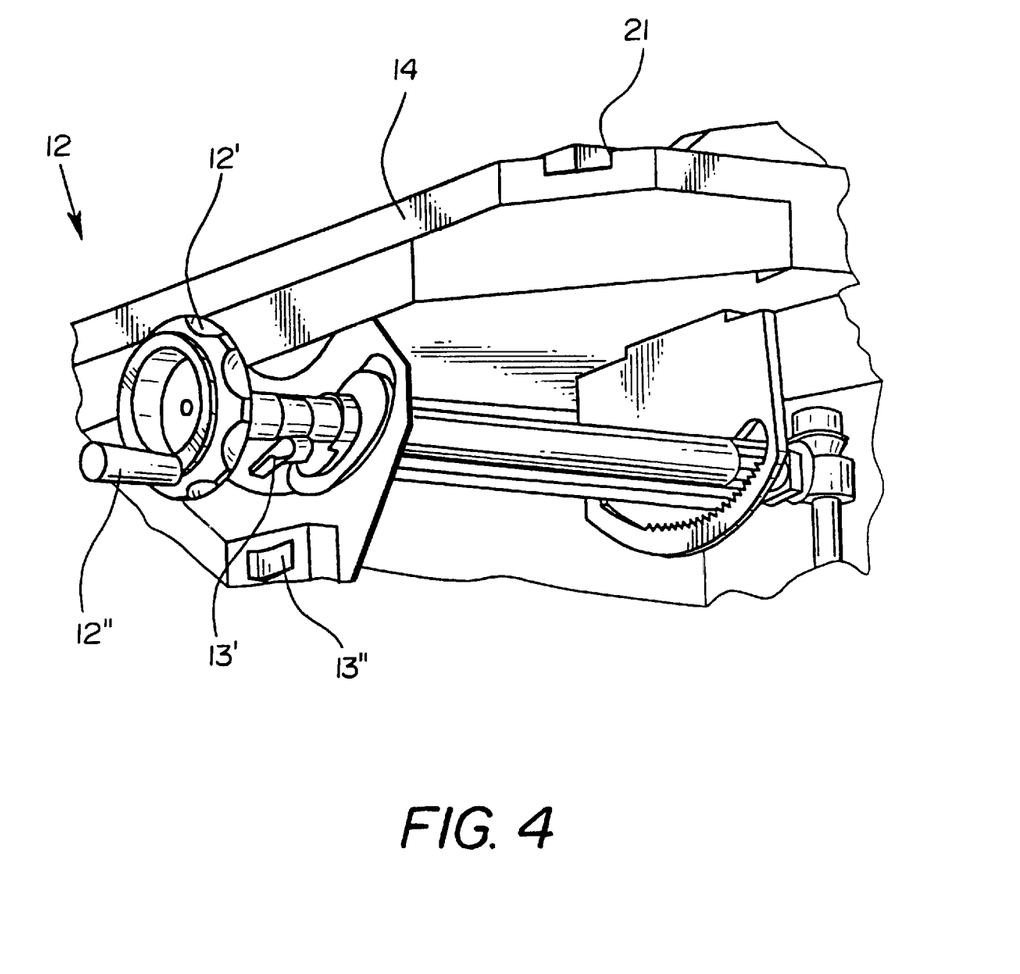
FIG. 4 is an enlarged sectional view of the region of the recess, showing the control element of the transportable circular table saw from FIG. 3.

FIGS. 3 and 4 show an alternative to this, where the tabletop 4 is unlockable by means of a locking lever 13' arranged at the control element 12. In addition there is a special feature in that an On/Off switch 13" is arranged at the control element 12.

In this embodiment, the control element 12 itself comprises an exterior turning knob 12' which is used to set the lateral inclination, as well as a crank 12" which ensures quick height adjustment of the circular saw blade 10.

This provides a highly compact arrangement with all control devices in close proximity to the control element 12.

This machine is particularly suitable for speed control and speed display (German Utility Model DE-U-297 12 892).

In addition, it can be provided for the sawing unit 7 to be lockable in its middle sliding position and/or in the rearmost sliding position, and preferably in other sliding positions also.

Basically, in an alternative suitable for certain embodiments of such a circular table saw, the sawing unit 7 is slidable in pulling direction only in the middle sliding position of the tabletop 4. In general, underbench circular crosscut saws are characterized by the sawing unit 7 being under spring tension in the direction of the rearmost sliding position.

From the state of the art in cross-cut, mitre-cut and circular table saws, it is known per se that, in the surrounding plate 14, a slot is arranged in the middle sliding position of the tabletop 4 which slot extends the saw slot 9. Such a design can of course also be realized in the circular table saw according to the invention. In addition, several such slots (not shown in FIG. 1) can be provided in several angular positions so as to increase the available lengths of the cuts in several angular positions.

Figure 5:
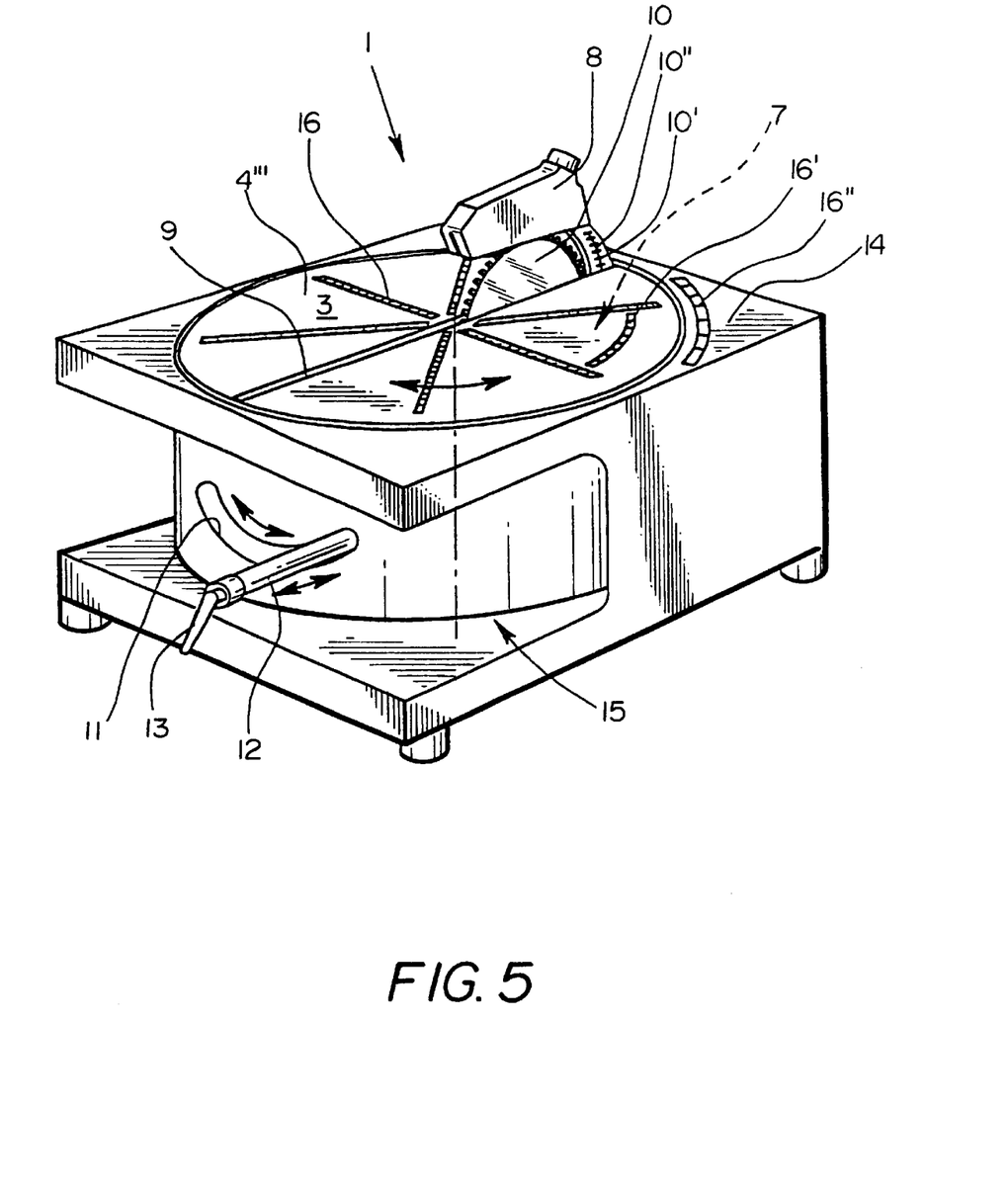
FIG. 5 is a view analogous to that of FIG. 1, of a modified embodiment of the circular table saw of FIG. 1.

FIG. 5 shows a modified embodiment of the circular table saw according to the invention, comprising rulers on the side of the circular saw blade 10; with the rulers being arranged at 45° angles to each other. In this way, the length of a saw cut can be set directly on the tabletop 4'" which also provides a protractor.

FIG. 5 also shows a particularly preferred embodiment of a transportable circular table saw, in that the tabletop 4'" forming the workpiece support surface 3 comprises a linear measurement scale 16, protractor 16' with reference to the vertical axis as the middle, and in that the surrounding top 14 comprises such a protractor 16". These protractors 16', 16" of which one or both can be provided, allow a particular alignment of a workpiece with reference to the circular saw blade 10, or reading off a particular intermediate angle for particular rotational positions of the tabletop 4'" with reference to the surrounding top 14.

FIG. 5 further indicates that the riving knife 10' which is height-adjustable with the circular saw blade 10 comprises a height scale 10" which displays the respective height of the cut of the circular saw blade 10.

Figure 6:
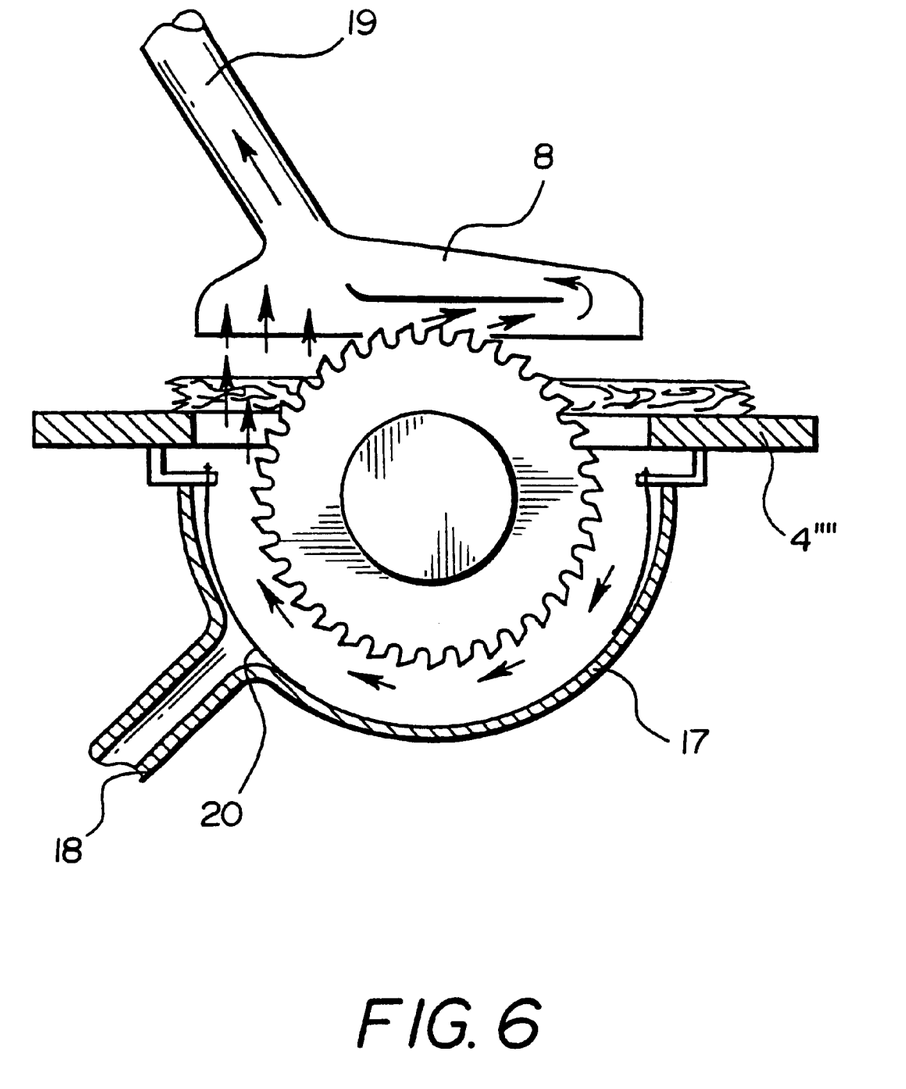
FIG. 6 is a partial sectional view of the region of the circular saw blade of a circular table saw according to the invention with a sawdust exhauster.

FIG. 6 shows a further embodiment with a sawdust collection box 17 below the tabletop 4"", with a extraction pipe 18 and the riving knife 8 configured as a sawdust exhauster hood with protective guard with an associated extraction pipe 19. Both extraction pipes 18, 19 are connected to an extraction fan (not shown).

FIG. 6 shows that the extraction pipe 18 is closed at the sawdust collection box 17. This is realized in such a way for the extraction pipe 18 optionally to be closable. Normally, both extraction pipes 18, 19 are open. For proper operation, each extraction pipe 18, 19 requires a certain air-volume stream for the sawdust to be carried along. This requires comparatively high energy expenditure in the suction device.

According to the invention it was recognized that normally all sawdust can be extracted satisfactorily via the sawdust exhauster 8 and its extraction pipe 19, so that normally the extraction pipe 18 at the sawdust collection box 17 can be closed. Only when extensive concealed cuts are carried out where the circular saw blade 10 does not penetrate right through the workpiece, is it necessary to open the extraction pipe 18 at the sawdust collection box 17.

FIG. 6 shows that the extraction pipe 18 at the sawdust collection box 17 is closed by an air ducting strip 20, which at the same time provides excellent upward guidance for the sawdust. In the embodiment shown, the air ducting strip 20 is attached to the tabletop 4"" and is made of spring steel so as to simply adapt to the contours of the sawdust collection box 17.

In order to open the extraction pipe 18, the air ducting strip 20 can be swivelled to the side but it is also possible to relocate the entire sawdust collection box 17 downward, thus opening the extraction pipe 18. There are various design options to achieve this.

Figure 7:
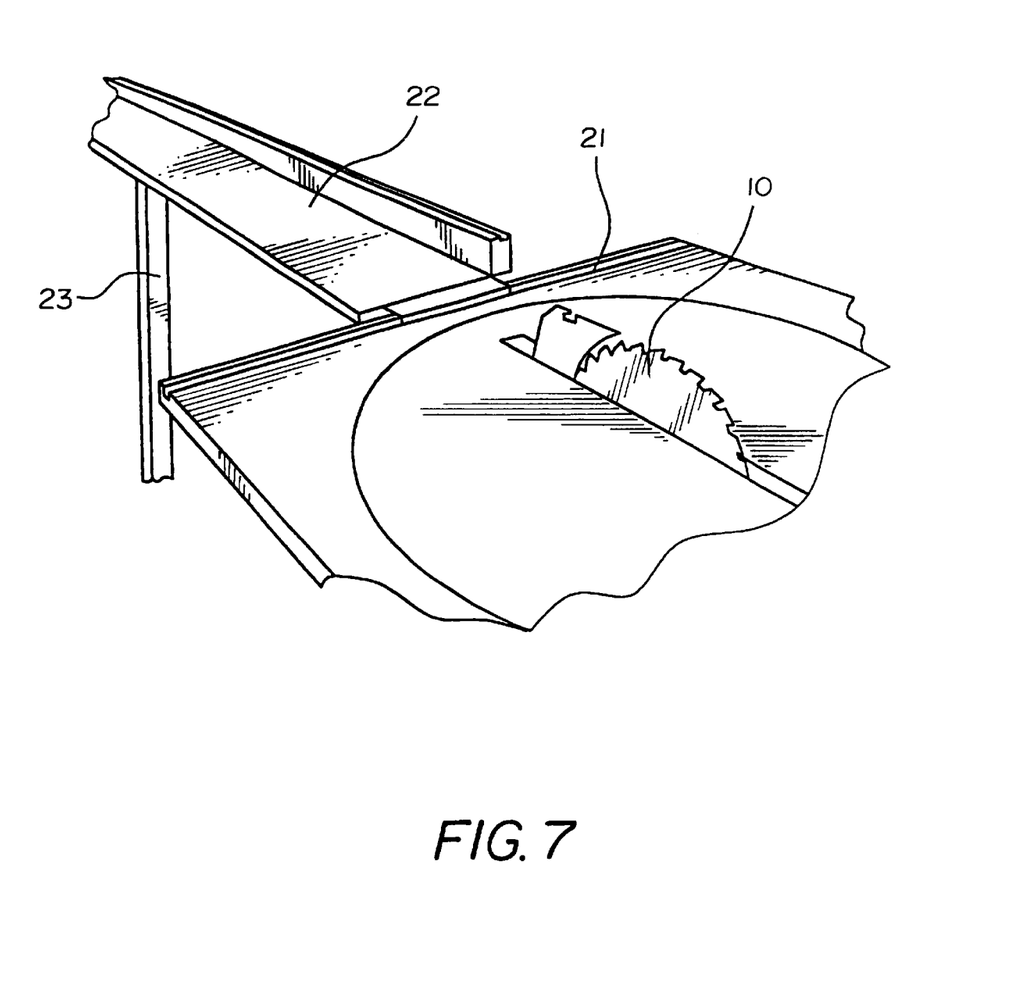
FIG. 7 is a perspective view of a tabletop extension on a transportable circular table saw according to the invention.

FIG. 3 shows that attachment elements 21, more specifically attachment grooves for a table extension 22 (shown in FIG. 7), are provided at the surrounding top 14, both at the front and at the sides. The table extension 22 comprises fold-out feet 23 and a stop ruler with an extendible stop and a ruler scale. It is interesting that this table extension 22 can be attached to any of the attachment elements 21 because the exterior housing 1 with the surrounding top 14 is essentially square and because the sawing unit 7 can be aligned in any direction.

Figure 8:
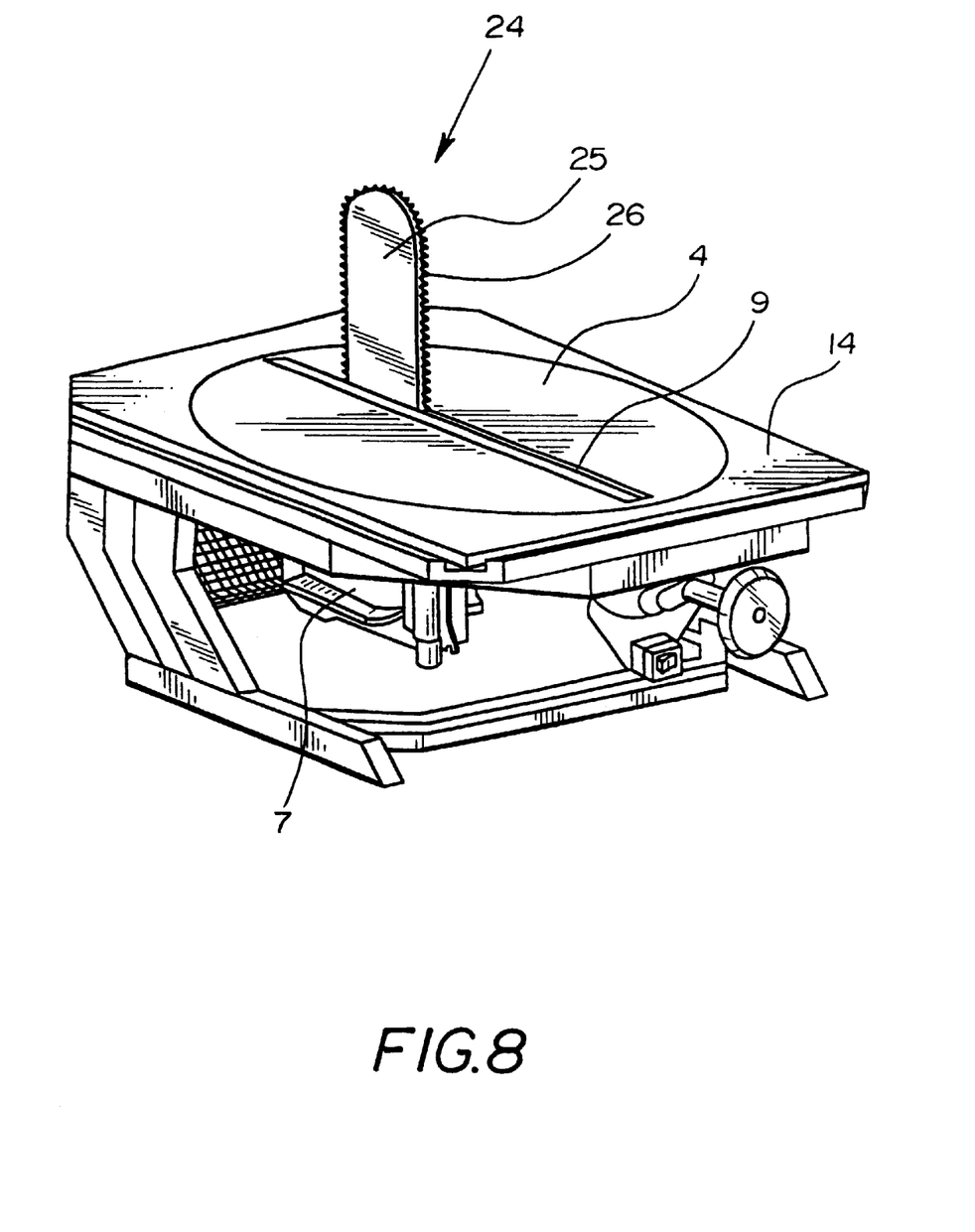
FIG. 8 corresponding to the representation of FIG. 3 is a further embodiment of a transportable circular table saw, in this instance with a chainsaw blade instead of a circular saw blade.

FIG. 8 shows a particular embodiment where the circular saw blade of the sawing unit 7 has been replaced by a chainsaw blade 24 whose longitudinal axis is aligned so as to be approximately perpendicular to the workpiece support surface 3. According to a preferred embodiment, the cutting length of the chainsaw blade 24 can be between 100 and 200 mm parallel to the workpiece support surface 3, and between 150 to 400 mm perpendicular to the workpiece support surface 3. A chainsaw blade 24 with a leaf-shaped chain support 25 and a surrounding saw chain 26 instead of a circular saw blade provides the advantage of a considerably longer cutting length perpendicular to the workpiece support surface 3, i.e., a respectively increased maximum cutting height.

What is claimed is:

1. A transportable table saw comprising:
   an exterior housing which is approximately square in plan view, said exterior housing having a non-reversible tabletop forming a workpiece support surface with a saw slot therein as well as left and right side panels defining a front side, a rear side, a left side and a right side of the exterior housing, the tabletop being in the exterior housing for rotation about a vertical axis which is perpendicular to said workpiece support surface, the exterior housing having a recess which emanates from the front side and extends between the left and right sides of the exterior housing under the tabletop so that the exterior housing has a horizontal U-shape;
   a sawing unit slidably arranged underneath the tabletop for movement relative to the workpiece support surface in a pulling direction, said sawing unit being mounted for rotation with the tabletop about said vertical axis and being inclinable to at least one side of a mitre cut axis in said pulling direction, said sawing unit having a driven saw blade, the saw blade protruding through the saw slot from below and being movable in the saw slot in said pulling direction with sliding movement of the sawing unit; and
   a control element for swiveling the tabletop being arranged in said recess so as to be freely swivelable in left and right directions from a center swiveling position of the tabletop.

2. A table saw according to claim 1, wherein an on/off switch is arranged on the control element.

3. A table saw according to claim 1, further comprising locking means for locking the sawing unit in at least one of a middle sliding position and a rearmost sliding position.

4. A table saw according to claim 1, wherein a linear measurement scale is provided on the tabletop which forms the workpiece support surface at an angle to a plane in which the circular saw blade rotates.

5. A table saw according to claim 1, wherein an angular scale is provided on at least one of the tabletop forming the workpiece support surface and a surrounding top surface of the exterior housing, said angular scale being an arc about a vertical center axis of the table top.

6. A saw according to claim 1, wherein the saw blade is a circular saw blade and a riving knife which is height-adjustable together with the circular saw blade has a height scale.

7. A table saw according to claim 1, wherein positioning elements for atable extension are provided on the exterior housing at least at one of front, rear and sides thereof.

8. A table saw according to claim 1, the exterior housing has a surrounding top which surrounds the tabletop and in which an extension slot is provided which extends the saw slot in a center swivelling position of the tabletop.

9. A table saw according to claim 8, wherein the surrounding top has additional extension slots which extend the saw slot in several angular swivelling positions of the tabletop.

10. A table saw according to claim 1, wherein that the sawing blade is a chainsaw blade which is aligned so as to be approximately perpendicular to the workpiece support surface.

11. A table saw according to claim 10, a cutting length of the chainsaw blade is between 100 and 200 mm parallel to the workpiece support surface and between 150 to 400 mm perpendicular to the workpiece support surface.

12. A table saw according to claim 1, further comprising means for locking the tabletop at least in a center position of swivelling.

13. A table saw according to claim 12, further comprising a control element for releasing said means for locking of the tabletop.

14. A table saw according to claim 12, further comprising a locking lever arranged on a control element for releasing of said means for locking of the tabletop.

15. A table saw according to claim 1, wherein the saw blade is a circular saw blade and a sawdust collection box with a closable extraction pipe is provided below the circular saw blade under the tabletop; wherein a sawdust extraction hood with an extraction pipe is provided above the tabletop; and wherein both extraction pipes are connectable to an extraction fan.

16. A saw table according to claim 15, wherein an air ducting strip is provided for closing the extraction pipe of the sawdust collection box.

17. A saw table according to claim 16, wherein the air ducting strip is formed of spring steel.

* * * * *